US006283624B1

(12) United States Patent
Tsai

(10) Patent No.: US 6,283,624 B1
(45) Date of Patent: Sep. 4, 2001

(54) SHADE ASSEMBLY FOR HEADLAMP

(76) Inventor: Chin-Ming Tsai, 4F, No. 266, Yen Ping S. Road, Taipei (TW)

(*) Notice: Subject to any disclaimer, the term of this patent is extended or adjusted under 35 U.S.C. 154(b) by 0 days.

(21) Appl. No.: 09/648,480

(22) Filed: Aug. 28, 2000

(51) Int. Cl.[7] ...................................................... B60Q 1/00
(52) U.S. Cl. .......................... 362/548; 362/548; 362/546
(58) Field of Search .................................... 362/353, 351, 362/433, 476, 547, 548, 539, 437, 439, 440, 369, 390, 546

(56) References Cited

U.S. PATENT DOCUMENTS 5,402,325 * 3/1995 Wisler et al. ........................ 362/548
5,497,298 * 3/1996 Luallin et al. ....................... 362/548
5,722,763 * 3/1998 Chen .................................... 362/163

* cited by examiner

*Primary Examiner*—Sandra O'Shea
*Assistant Examiner*—Bao Truong
(74) *Attorney, Agent, or Firm*—Rosenberg, Klein & Lee

(57) ABSTRACT

A shade assembly for covering a lamp assembly of a headlamp is provided. The shade assembly mainly includes a shade holder and a shade seated on a number of anti-vibration supports provided on inner wall surface of the shade holder. The shade holder is also provided on its peripheral wall with a number of radially outward extended fork-headed legs that are adapted to engage with lugs provided on a lamp holder of the lamp assembly independent of the US or European specification of the lamp holder. Heated produced by the lighted lamp is allowed to dissipate from the shade via convection holes provided on the wall of the shade holder and a heat-diffusing hole provided on a top of the shade through the effect of air convection in the shade.

1 Claim, 3 Drawing Sheets

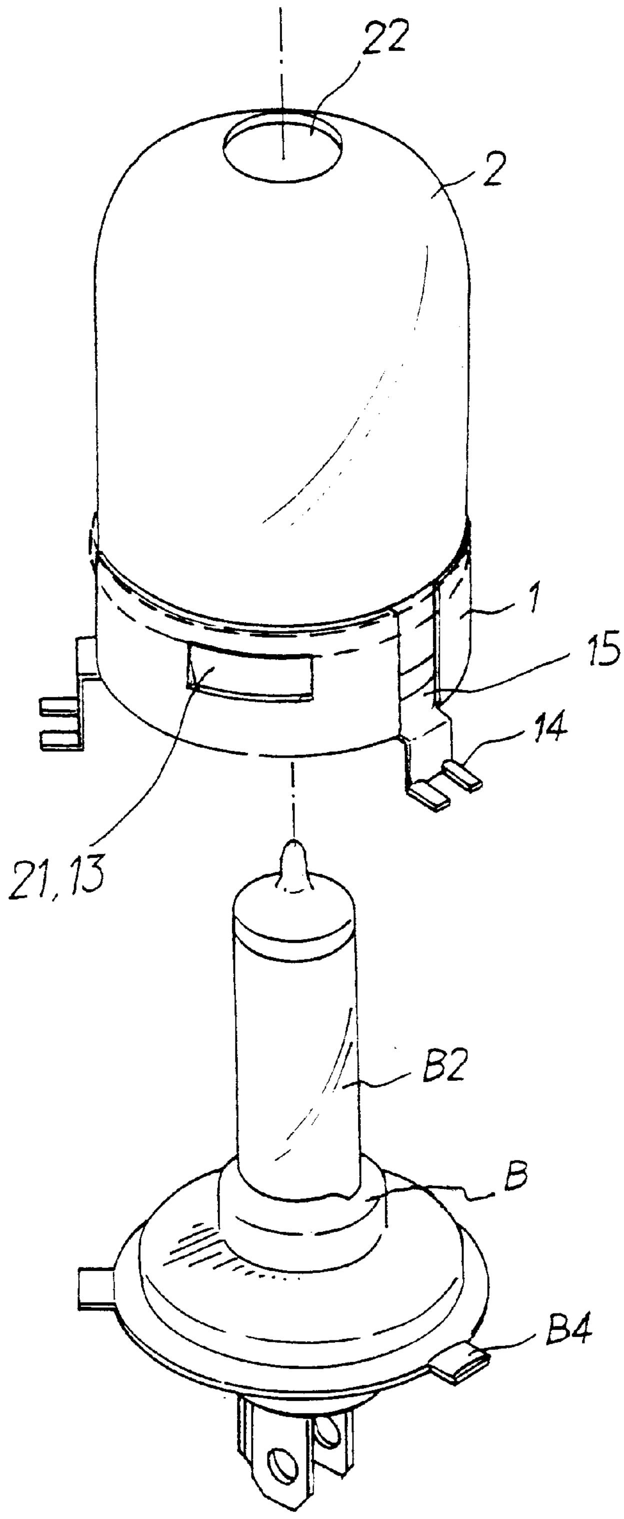
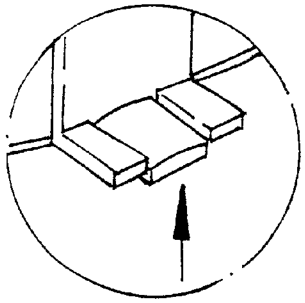
FIG.3A
FIG. 3

SHADE ASSEMBLY FOR HEADLAMP

BACKGROUND OF THE INVENTION

The present invention relates to a shade assembly for headlamp, and more particularly to a shade assembly that includes a shade holder adapted to fix on a lamp holder either in US or European specification and allows heat produced by the lamp covered therein to well dissipate from the shade assembly.

A headlamp A for a motor vehicle typically includes a lamp B2 fixed on a lamp holder B and a shade B1 fixed on a shade holder B3, as shown in FIG. 1. The shade holder B3 is connected to lugs B4 provided on the lamp holder B. The lamp B2 usually produces yellowish white light that does not provide good illuminating effect in foggy areas and is therefore selectively replaced with a colored lamp, such as yellow and blue lamps. The lamp holder B has specification varied with its origin. Since there are many countries manufacturing motor vehicles, and lamp holders B made by these countries usually have different specifications, it is necessary to produce shades B1 of different specifications to adapt to these differently sized lamp holders B. Conventional shades B1 are made of glass that does not provide good conduction of heat and define a completely closed inner space therein. When the shade B1 is connected to the lamp holder B to cover the lamp B2, heat produced by the lighted lamp B2 tends to be sealed in the shade B1 and could not be radiated. Therefore, the lamp B2 tends to easily break due to overheating after being used for a prolonged time.

SUMMARY OF THE INVENTION

It is therefore a primary object of the present invention to provide a shade assembly for headlamp that permits a lamp covered by it to maintain a designed usable life and is adapted to fix on lamp holders of either US or European specification.

Another object of the present invention is to provide a shade assembly for headlamp, a shade holder of which includes anti-vibration supports with suitable flexibility for supporting the shade, so that the shade is not subject to breaking due to vibration during driving.

To achieve the above and other objects, the shade assembly for headlamp according to the present invention mainly includes a shade holder and a shade seated on a number of anti-vibration supports provided on inner wall surface of the shade holder. The shade holder is also provided on its peripheral wall with a number of radially outward extended fork-headed legs adapted to engage with lugs provided on a lamp holder of the headlamp and thereby causes the shade to cover the lamp no matter what specification the lamp holder has. The shade holder is also provided on its wall with a number of convection holes and the shade is provided on a top with a heat-dissipating hole. Heat produced by the lighted lamp can move out of the shade via the convection holes on the shade holder and the heat-diffusing hole on the top of the shade through the effect of air convection thereof. A ferrule is put around a joint of the shade and the shade holder to fasten them together.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3 is illustrates the manner of connecting the shade assembly of FIG. 2 to the lamp assembly of FIG. 1.

DETAILED DESCRIPTION OF THE PREFERRED EMBODIMENTS

Figure 2:
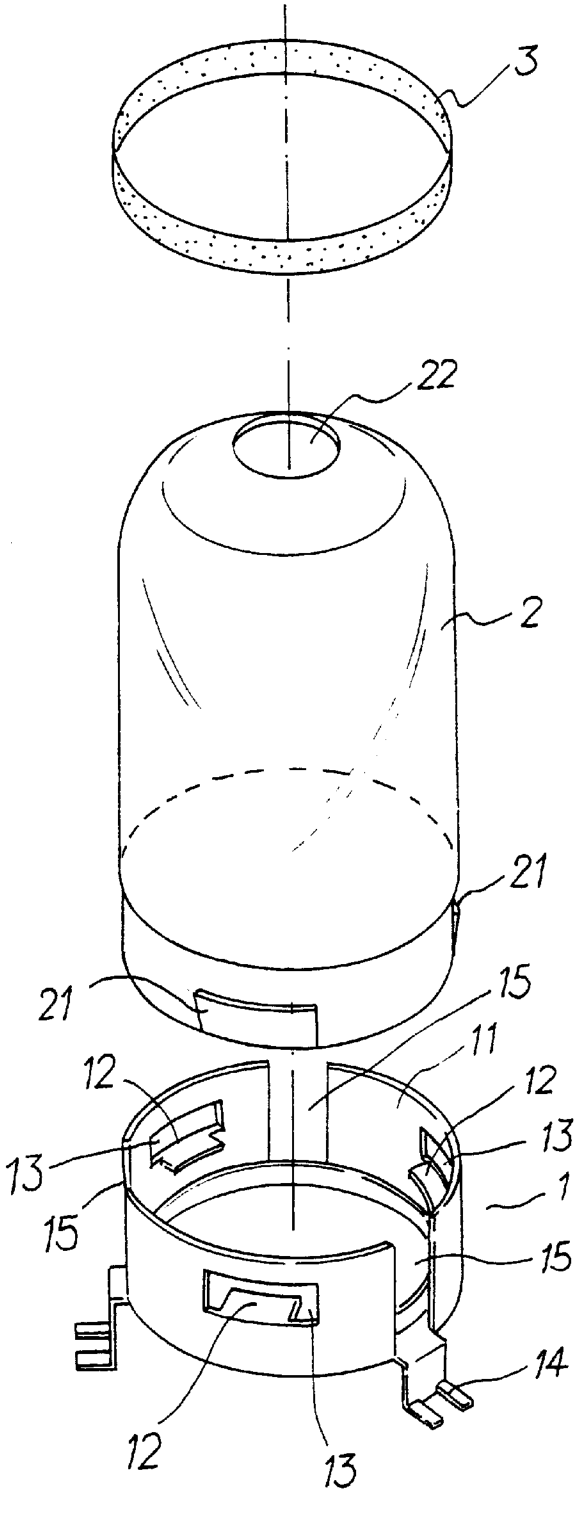
FIG. 2 is an exploded perspective of a shade assembly for headlamp according to the present invention.

Please refer to FIG. 2 that is an exploded perspective of a shade assembly for a headlamp according to the present invention. As shown, the shade assembly mainly includes a shade holder 1, a shade 2, and a ferrule 3.

The shade holder 1 is an annular member having a circumferential wall 11 defining an inner space therein. The wall 11 is not completely closed. Some portions of the wall 11 at predetermined positions are cut away to provide a number of convection holes 15. Portions of the wall 11 immediately below the convection holes 15 downward and radially outward extend to provide a number of fork-headed legs 14. A number of spaced anti-vibration supports 12 having suitable flexibility radially inward project from an inner surface of the wall 11. And, portions of the wall 11 above the anti-vibration supports 12 are cut away to provide a number of engaging holes 13.

The shade 2 is an open-bottomed member and is provided at a top with a heat-diffusing hole 22 and around a lower outer wall surface with a number of radially outward projected engaging blocks 21. The number and the shape of the engaging blocks 21 correspond to that of the engaging holes 13 provided on the wall 11 of the shade holder 1. And, outer surfaces of the engaging blocks 21 taper from top to bottom.

The ferrule 3 is a ring member for fix around a joint of the shade holder 1 and the shade 2 to bind them together.

To form the shade assembly, the shade 2 is seated inside the shade holder 1 by disposing it from a top of the shade holder 1 down into the wall 11, so that the engaging blocks 21 are separately engaged into an engaging hole 13. At this point, a lower circumferential edge of the shade 2 would be rested on the anti-vibration supports 12. The engaging holes 13 and the anti-vibration supports 12 together protect the shade 2 against undesired vibration. The ferrule 3 is fastened around the joint of the shade holder 1 and the shade 2 to firmly connect them to each other.

Figure 1:
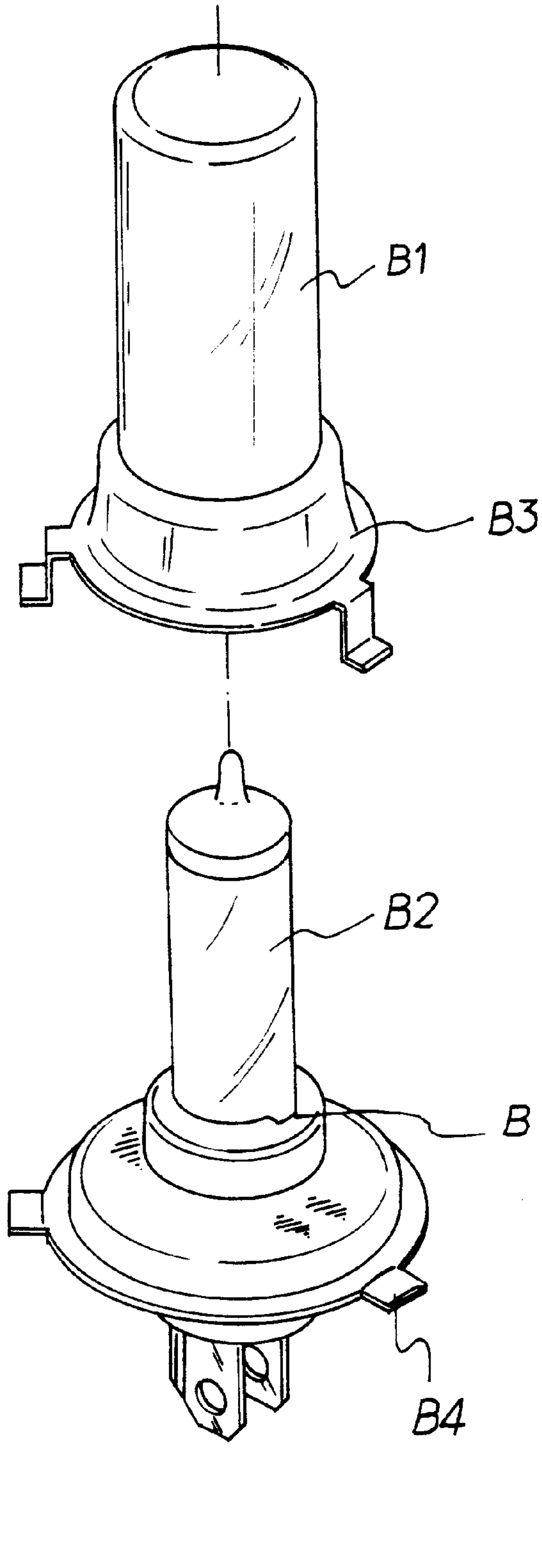
FIG. 1 is an exploded perspective of conventional lamp assembly and shade assembly for a headlamp.

To connect the shade assembly of the present invention to the lamp assembly of FIG. 1, first align the fork-headed legs 14 of the shade assembly with the lugs B4 radially outward projected from outer periphery of the lamp holder B, so that each of the lugs B4 is stably located between two prongs of each of the fork-headed legs 14. The shade assembly and the lamp assembly are so dimensioned that the two assemblies contact with one another only at the fork-headed legs 14 and the lugs B4. That is, a firm and stable connection of the shade assembly to the lamp holder B of the lamp assembly is possible, independent of the size of the lamp B2 and the specification of the lamp holder B.

When the shade assembly is connected to the lamp assembly, the convection holes 15 provided on the lower part of the wall 11 of the shade holder 1 and the heat-diffusing hole 22 provided on the top of the shade 2 together allow heat produced by the lighted lamp B2 to dissipate from the shade 2 through air convection via the convection holes 15 and the heat diffusing hole 22. The lamp B2 can therefore be protected against expansion or even breaking due to overheating. A prolonged usable life of the lamp B2 is therefore possible.

With the above arrangements of the present invention, the problems existing in the conventional headlamp, such as the restriction on connecting the shade holder only to a lamp holder of the same specification, the easily vibrated shade, and the easily overheated and broken lamp, all can be solved. The present invention is therefore practical for use and has industrial value.

What is claimed is:

1. A shade assembly adapted for being attached to a lamp assembly of a headlamp, said lamp assembly including a lamp and a lamp holder having a plurality of lugs spaced along a periphery of said lamp holder and radially extending therefrom, said shade assembly comprising:

(a) a shade holder attachable to said lamp holder of said lamp assembly, said shade holder being shaped as an annular member having a continuous circumferentially contoured edge and a plurality of arched wall sections extending from said circumferentially contoured edge and spaced therealong, said wall sections defining an inner space of said shade holder, each of said wall sections having side edges thereof spaced from respective side edges of adjacent wall sections, thus forming a plurality of convection holes, each convection hole being located at a predetermined position along said circumferentially contoured edge in alignment with a respective one of said plurality of lugs of said lamp holder, said shade holder further including a plurality of fork-headed legs, each extending downward and radially outward from said circumferentially contoured edge at said predetermined positions therealong for engagement with said lugs of said lamp holder, each of said wall sections being provided with an engaging closedly contoured hole formed therein and having a lower edge and a higher edge opposite to said lower edge, and a plurality of anti-vibration supports having a predetermined flexibility, each of said anti-vibration supports projecting from an inner surface of a respective one of said wall sections radially and inwardly from said lower edge of said convection hole formed in said respective wall section;

(b) a shade received within said inner space of said shade holder, said shade including an open-bottomed member provided at a top thereof with a heat-diffusing hole, said open-bottomed member including a lower outer peripheral wall and a plurality of radially projecting outward engaging blocks spaced along said peripheral wall of said open-bottomed member of said shade and located thereat at predetermined positions aligned with said engaging holes of said shade holder, each of said engaging blocks having a bottom edge, a top edge, and an outer surface tapering from said top edge to said bottom edge thereof, and being shaped to match the contour of said engaging holes, each said engaging block engaging within a respective one of said engaging holes of said shade holder with said bottom edge of said engaging block supported by said anti-vibration support, and with said top edge of said engaging hole protruding outside of said respective wall section at said higher edge of said respective engaging hole, thus coupling said shade to said shade holder; and (c) a ferrule, said ferrule being a ring member positioned around a joint formed between said shade holder and said shade to enhance connection therebetween.

* * * * *